United States Patent [19]
Sugifune et al.

[11] Patent Number: 5,648,650
[45] Date of Patent: Jul. 15, 1997

[54] OPTICAL BAR CODE READING APPARATUS WITH REGULAR REFLECTION DETECTING CIRCUIT

[75] Inventors: Shin Sugifune; Tsutomu Kanno; Hajime Nabeya, all of Miyagi-ken, Japan

[73] Assignee: Alps Electric Co., Ltd., Tokyo, Japan

[21] Appl. No.: 512,052

[22] Filed: Aug. 7, 1995

[30] Foreign Application Priority Data

Sep. 7, 1994 [JP] Japan .................. 6-214023

[51] Int. Cl.$^6$ .................................. G06K 7/10
[52] U.S. Cl. ............. 235/472; 235/455; 235/462; 235/466
[58] Field of Search ............... 235/472, 462, 235/455, 454, 466

[56] References Cited

U.S. PATENT DOCUMENTS

| | | | |
|---|---|---|---|
| 4,315,245 | 2/1982 | Makahara et al. | 235/455 X |
| 4,542,528 | 9/1985 | Sanner et al. | 235/440 X |
| 5,034,619 | 7/1991 | Hammond, Jr. | 235/462 X |
| 5,099,109 | 3/1992 | Ishikawa et al. | 235/462 |
| 5,115,325 | 5/1992 | Kallin et al. | 358/406 |
| 5,117,098 | 5/1992 | Swartz | 235/472 |
| 5,258,605 | 11/1993 | Metlitsky et al. | 235/462 |
| 5,347,110 | 9/1994 | Audebert et al. | 235/380 |
| 5,349,172 | 9/1994 | Roustaei | 235/472 |
| 5,354,977 | 10/1994 | Roustaei | 235/472 |
| 5,359,185 | 10/1994 | Hanson | 235/472 |
| 5,382,782 | 1/1995 | Hasegawa et al. | 235/455 |
| 5,396,054 | 3/1995 | Krichever et al. | 235/472 X |
| 5,406,062 | 4/1995 | Hasegawa et al. | 235/462 |
| 5,408,084 | 4/1995 | Brandorff et al. | 235/472 X |
| 5,428,212 | 6/1995 | Tani et al. | 235/472 |
| 5,532,467 | 7/1996 | Roustaei | 235/472 |

FOREIGN PATENT DOCUMENTS

| | | |
|---|---|---|
| 0298517 | 1/1989 | European Pat. Off. . |
| 57-147777 | 9/1982 | Japan . |
| 58-101564 | 6/1983 | Japan . |
| 6-139399 | 5/1994 | Japan . |

*Primary Examiner*—Donald T. Hajec
*Assistant Examiner*—Michael G. Lee
*Attorney, Agent, or Firm*—Guy W. Shoup; Patrick T. Bever

[57] ABSTRACT

An optical reading apparatus (bar code reader) including a plurality of light emitting elements, each light emitting element emitting light in different directions onto an information recording surface which has a linear recording (bar code pattern) printed thereon. A light receiving element receives reflected light from the information recording surface and generates a recording medium read signal which is transmitted to a signal processing section for converting the recording medium read signal into a display signal. The recording medium read signal is also transmitted to a regular reflection detection section. When the regular reflection detection section detects the occurrence of a regular reflection condition from the recording medium read signal, the regular reflection detection section transmits a regular reflection detection signal to a driving controlling section which controls light emission from the plurality of light emitting elements. In response to the regular reflection detection signal, the controlling driving section turns off the light emitting element whose emitted light is causing the regular reflection condition, thereby eliminating the occurrence of the regular reflection condition.

6 Claims, 12 Drawing Sheets

REGULAR REFLECTION CONDITION

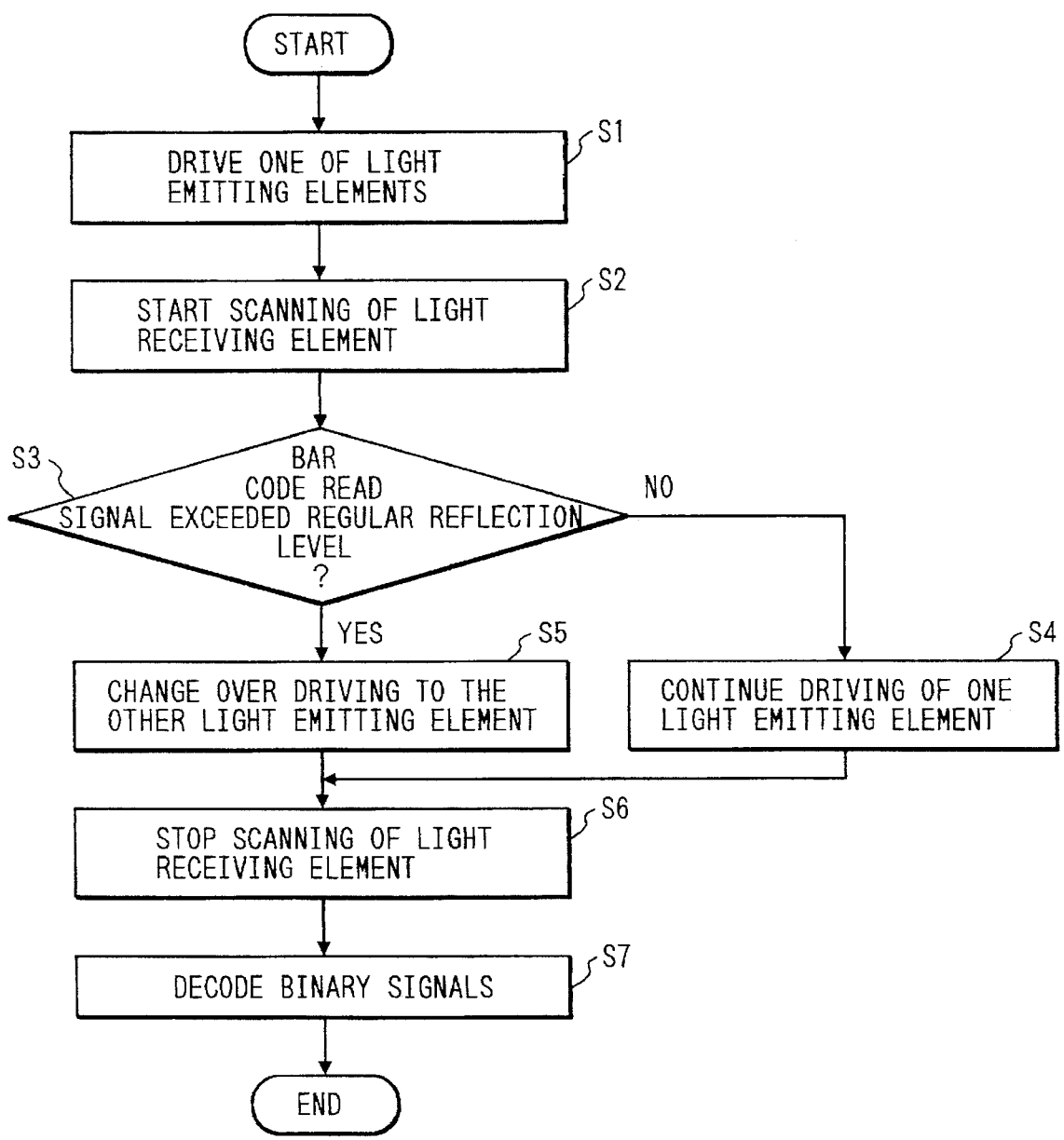

OPTICAL BAR CODE READING APPARATUS WITH REGULAR REFLECTION DETECTING CIRCUIT

BACKGROUND OF THE INVENTION

1. Field of the Invention

This invention relates to an optical reading apparatus such as a bar code reader for reading a linear recording medium such as a bar code and converting it into a display signal, and more particularly to an optical reading apparatus such as a bar code reader which prevents reading of a linear recording medium from being disabled by a regular reflection condition which occurs upon reading of the linear recording medium.

2. Description of the Related Art

A bar code reader which reads a bar code performs conversion processing of the thus read bar code such as decoding and outputs a resulted signal as a required display signal conventionally includes a light emitting element for emitting light to an information recording surface on which a bar code is printed, a light receiving element for receiving reflected light from the information recording surface and generating a bar code read signal, a signal processing section for performing conversion processing of the bar code read signal such as amplification, binary digitization, decoding and so forth and outputting a resulted signal as a required display signal, and a driving section for driving the light emitting element.

FIG. 10 shows, in block diagram, an example of a construction of a known bar code reader of the type described above. Meanwhile, FIGS. 11(a) and 11(b) are signal waveform diagrams illustrating conditions of signals at several portions of the known bar code reader when a bar code is read, and FIG. 12 is a schematic sectional view showing the known bar code reader during use.

As seen from FIGS. 10 and 12, a bar code 61 is printed on an information recording surface 61a. A light emitting element 62 formed from a light emitting diode (LED) or a like element is located in the proximity of a reading portion (end portion) of the bar code reader, and a light receiving element 63 formed from a photodiode array or a like device is located a little rearwardly of the light emitting element 62 at the reading portion (end portion) of the bar code reader. Light emitted from the light emitting element 62 is reflected by the information recording surface 61a on which the bar code 61 is printed, and is then condensed by a lens 63a and introduced into the light receiving element 63 by way of a pin hole plate 63b. The output of the light receiving element 63 is connected to the input of an amplifier 64, and the output of the amplifier 64 is connected to the input of a binary digitizing circuit 65. The output of the binary digitizing circuit 65 is connected to the input of a decoding circuit 66, and the output of the decoding circuit 66 makes the output of the bar code reader. In this instance, the amplifier 64, the binary digitizing circuit 65 and the decoding circuit 66 constitute a signal processing section. A driving section 67 supplies driving power for driving the light emitting element 62.

Operation of the bar code reader having the construction described above will be described below with reference to FIGS. 11(a) and 11(b). Now, if a user grasps the bar code reader in a hand so that the reading portion (end portion) of the bar code reader may be opposed to the information recording surface 61a on which the bar code 61 is printed, then light emitted from the light emitting element 62 and irradiated upon the information recording surface 61a on which the bar code 61 is printed is reflected by the information recording surface 61a, and the reflected light is supplied to the light receiving element 63. Upon reception of the reflected light, the light receiving element 63 generates a bar code read signal and supplies the bar code read signal to the signal processing section constituted from the amplifier 64, the binary digitizing circuit 65 and the decoding circuit 66. In the signal processing section, the bar code read signal is first amplified to a predetermined level by the amplifier 64 and then converted into a binary signal by the binary digitizing circuit 65. Then, the binary signal is decoded by the decoding circuit 66, and the decoded signal from the decoding circuit 66 is outputted as a display signal from the bar code reader. In this instance, when such a pattern of the bar code 61 as seen at the top stage in FIG. 11(a) is read, the amplified bar code read signal waveform A appearing on the output side of the amplifier 64 exhibits such a form of pulses corresponding to the bar code 61 as seen at the middle stage in FIG. 11(a), and the binary signal waveform B appearing on the output side of the binary digitizing circuit 65 exhibits such a binary signal corresponding to the bar code 61 as seen at the lower stage in FIG. 11(a).

It is to be noted that light to be irradiated from the bar code 61 upon the information recording surface 61a on which the bar code 61 is printed may be continuous light or intermittent light which has a predetermined timing pattern.

By the way, in the known bar code reader described above, in reading the information recording surface 61a on which the bar code 61 is printed, when the light irradiation angle at which light is irradiated from the light emitting element 62 upon the information recording surface 61a on which the bar code 61 is printed and the light receiving angle at which light reflected from the information recording surface 61a on which the bar code 61 is printed is inputted to the light receiving element 68 satisfy individual particular requirements, a condition wherein most of light irradiated upon the information recording surface 61a on which the bar code 61 is printed is received as reflected light by the light receiving element 68, that is, a condition wherein the amount of light received by the light receiving element 63 exhibits a sharp peak condition, occurs. This condition is normally called regular reflection condition. When such regular reflection condition is entered, a large amount of light is introduced into the light receiving element 63 at a time, and the bar code read signal extracted from the light receiving element 63 exhibits a sudden variation to a very large amplitude. Thus, the amplifier 64 at the next stage is saturated by the bar code read signal of the large amplitude thus inputted thereto, and consequently, at least part of bar code components of the bar code read signal is lost as seen from the signal waveform C of FIG. 11(b). If such bar code read signal is inputted to the binary digitizing circuit 65, the binary digitizing circuit 65 cannot extract the bar code components from within the bar code read signal due to the loss of at least part of the bar code components. Consequently, the binary digitizing circuit 65 cannot generate a binary signal corresponding to the bar code components as seen from the signal waveform D of FIG. 11(b). Further, since the binary signal supplied from the binary digitizing circuit 65 to the decoding circuit 66 does not include at least part of the binary signal corresponding to the bar code components, the decoding circuit 66 cannot generate a decoded signal corresponding to the bar code components and accordingly cannot output a required display signal from the bar code reader.

Consequently, with the known bar code reader described above, when such a regular reflection condition as described above occurs, a reading operation of the information recording surface 61a on which the bar code 61 is printed is performed repetitively until bar code components are read, that is, until a required display signal is outputted from the bar code reader.

The known bar code reader described above, however, is disadvantageous in that, when a regular reflection condition occurs, much time is required for accurate reading of the bar code 61 because a reading operation of the information recording surface 61a on which the bar code 61 is printed must be performed repetitively until a required display signal is outputted from the bar code reader. The known bar code reader is further disadvantageous in that, particularly where a user of the bar code reader is inclined to perform a reading operation of the bar code 61 in a condition in which a regular reflection condition occurs comparatively likely, much more time is required to accurately read the bar code 61.

SUMMARY OF THE INVENTION

It is an object of the present invention to provide an optical reading apparatus which can accurately read a linear recording medium immediately even if a regular reflection condition occurs.

In order to attain the object described above, according to an aspect of the present invention, there is provided an optical reading apparatus, which comprises a plurality of light emitting elements for emitting intermittent or continuous light beams at a predetermined timing or timings in different directions to an information recording surface on a linear recording medium thereon, a light receiving element for receiving reflected light from the information recording surface and generating a recording medium read signal, a signal processing section for converting the recording medium read signal from the light receiving elements into a display signal, a controlling driving section for driving the plurality of light emitting elements, and a regular reflection detection section for detecting occurrence of a regular reflection condition from the recording medium read signal from the light receiving element and supplying a regular reflection detection signal obtained upon such detection to the driving controlling section, the driving controlling section controlling, when the regular reflection detection signal is supplied thereto from the regular reflection detection section, driving of the plurality of light emitting elements in a different driving manner from that when the regular reflection detection signal is not supplied thereby to eliminate occurrence of the regular reflection condition.

In the optical reading apparatus, the regular reflection detecting section detects occurrence of a regular reflection condition from the recording medium read signal from the light receiving element and supplies a regular reflection detection signal, which is obtained when occurrence of a regular reflection condition is detected, to the controlling driving section. The driving controlling section controls, when the regular reflection detection signal is supplied thereto, driving of the plurality of light emitting elements in the driving manner different from that when the regular reflection detection signal is not supplied thereto. More particularly, when the regular reflection detection signal is not supplied, the controlling driving section drives only one of the plurality of light emitting elements, but when the regular condition detection signal is supplied thereto, the controlling driving section drives another one of the light irradiation sections different from the one light irradiation section, to eliminate the occurrence of the regular reflection condition, or when the regular reflection detection signal is not supplied thereto, the controlling driving section drives all of the plurality of light emitting elements, but when the regular reflection detection signal is supplied thereto, the controlling driving section stops driving of the plurality of light emitting elements one by one in order until occurrence of the regular reflection condition is detected no more, to eliminate the occurrence of the regular reflection condition, or else, when the regular reflection detection signal is not supplied thereto, the controlling driving section drives the plurality of light emitting elements intermittently at different timings from each other, but when the regular reflection detection signal is supplied thereto, the controlling driving section immediately stops driving of that one of the light emitting elements with which the regular reflection condition occurs to eliminate the occurrence of the regular reflection condition.

In this manner, with the optical reading apparatus, since the controlling driving section drives the plurality of light emitting elements suitably such that, when occurrence of a regular reflection condition is detected by the regular reflection detecting section, the occurrence of the regular reflection condition may be eliminated, there is an advantage in that reading of a linear recording medium to generate a display signal is not disabled at all irrespective of whether or not a regular reflection condition occurs and accurate reading of the linear recording medium can be performed immediately.

According to another aspect of the present invention, there is provided an optical reading apparatus, which comprises a plurality of light emitting elements for emitting intermittent light beams at a predetermined timing or timings in different directions to an information recording surface on a linear recording medium thereon, a light receiving element for receiving reflected light from the information recording surface and generating a recording medium read signal, a signal processing section for converting the recording medium read signal from the light receiving element into a display signal, and a controlling driving section for driving the plurality of light emitting elements, the plurality of light emitting elements being controlled to be driven by the controlling driving section so as to emit intermittent light beams at timings different from each other, the signal processing section having a plurality of conversion processing routes for individually performing conversion processing of a plurality of recording medium read signals obtained individually from the plurality of light emitting elements, the signal processing section selectively extracting and outputting, as a display signal, that one of the recording medium read signals obtained by the conversion processing by the plurality of conversion processing routes which is in a good condition.

In the optical reading apparatus, driving of the plurality of light emitting elements is controlled such that they irradiate intermittent beams of light at different timings from each other, and the signal processing section has a plurality of conversion processing routes for individually performing conversion processing of a plurality of recording medium read signals obtained individually for the plurality of light emitting elements and selectively extracts and outputs, as a display signal, one of recording medium read signals obtained by conversion processing by the plurality of conversion processing routes which is in a good condition. More particularly, when the plurality of recording medium read signals are decoded, one of the recording medium read signals which has been decoded regularly is selectively extracted and outputted as a display signal, or occurrence of one of the plurality of recording medium read signals with which a regular reflection condition occurs is detected, and another one of the plurality of recording medium read signals with which occurrence of a regular reflection condition is not detected is selectively extracted and outputted as a display signal.

In this manner, with the optical reading apparatus, there is an advantage in that, since that one of the plurality of recording medium read signals which is in a good condition is selectively extracted and outputted, reading of a linear recording medium to generate a display signal is not disabled at all irrespective of whether or not a regular reflection condition occurs and accurate reading of the linear recording medium can be performed immediately.

The above and other objects, features and advantages of the present invention will become apparent from the following description and the appended claims, taken in conjunction with the accompanying drawings which like parts or elements are denoted by like reference characters.

BRIEF DESCRIPTION OF THE DRAWINGS

FIG. 4 is a flow chart illustrating operations of detection of occurrence of a regular reflection condition and changing over between light emitting elements in the optical reading apparatus of FIG. 1;

DESCRIPTION OF THE PREFERRED EMBODIMENTS

In the following, preferred embodiments of the present invention will be described in detail with reference to the accompanying drawings.

Figure 1:
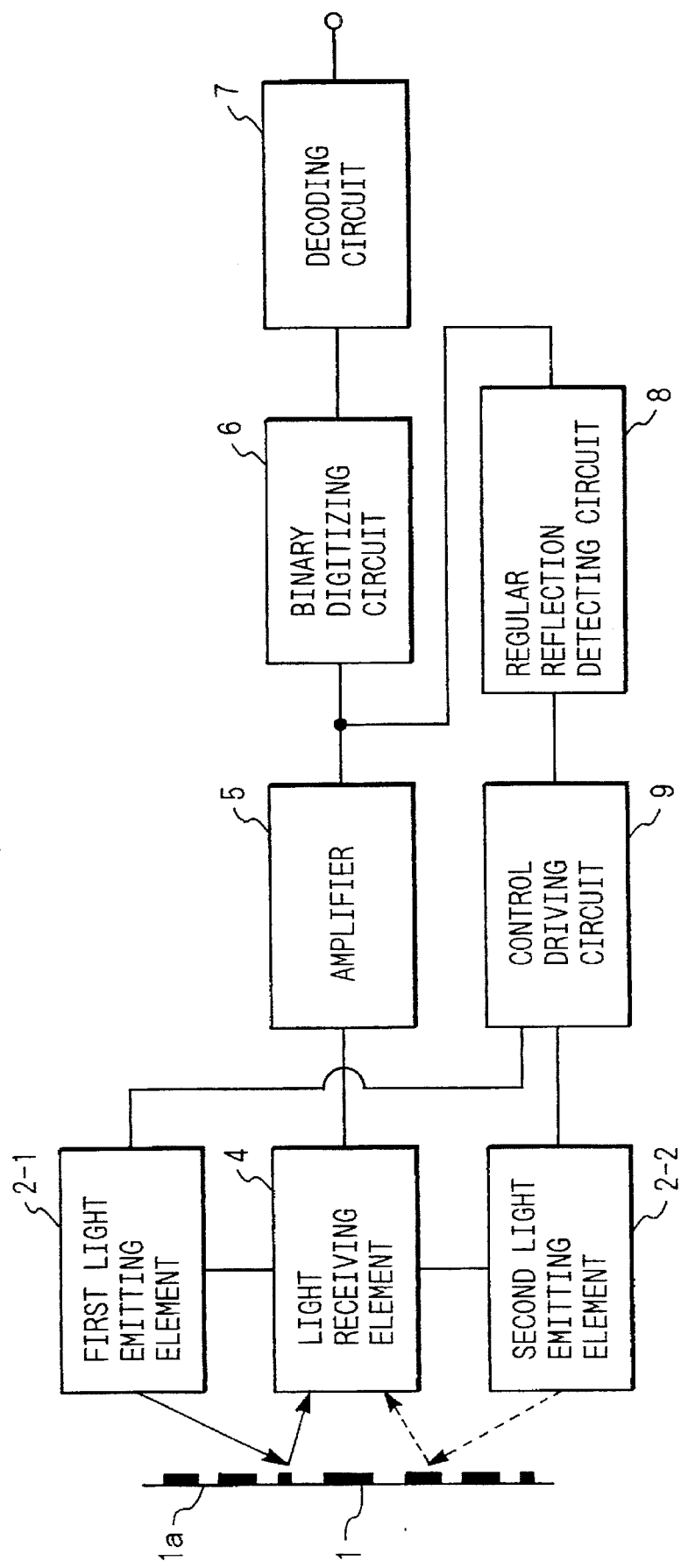
FIG. 1 is a block diagram of an optical reading apparatus showing a first preferred embodiment of the present invention.

FIG. 1 shows, in block diagram, an optical reading apparatus according to a first preferred embodiment of the present invention. The optical reading apparatus shown is constructed as a bar code reader. Meanwhile, FIG. 2 shows, in schematic sectional view, the bar code reader during use.

Figure 2:
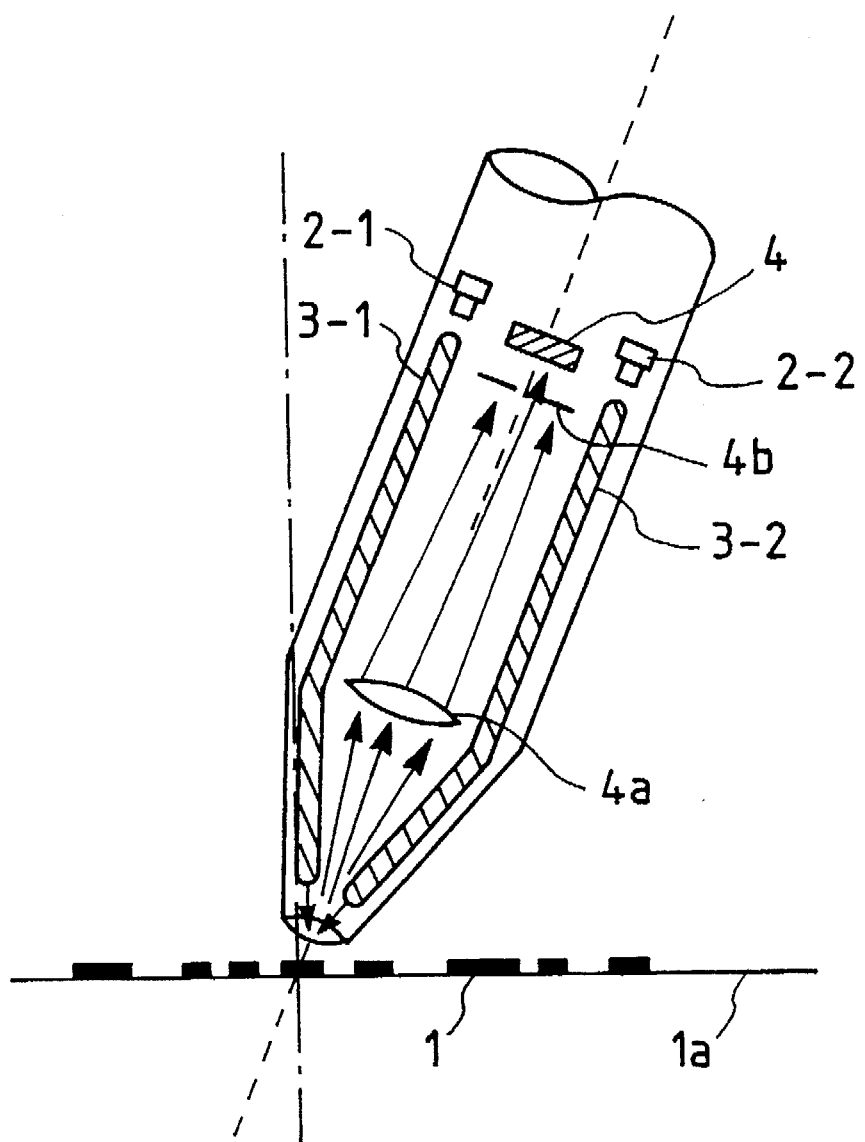
FIG. 2 is a schematic sectional view showing the bar code reader of FIG. 1 during use.

Referring to FIGS. 1 and 2, a bar code 1 is printed, similarly to a known bar code, on an information recording surface 1a. A pair of first and second light emitting elements 2-1 and 2-2 each formed from a light emitting diode (LED) or a like element are disposed at locations comparatively in the proximity of a reading portion (end portion) of the bar code reader, and a pair of optical transmission lines 3-1 and 3-2 each formed from a glass fiber or a like element are interposed between the first and second light emitting elements 2-1 and 2-2 and the reading portion (end portion). A light receiving element 4 formed from a photodiode array or a like device is disposed in a juxtaposed relationship to the first and second light emitting elements 2-1 and 2-2. Light obtained from the first and second light emitting elements 2-1 and 2-2 is projected outwardly by way of the optical transmission lines 3-1 and 3-2 and is reflected by the information recording surface 1a on which the bar code 1 is printed. The reflected light is first condensed by a lens 4a and then introduced into the light receiving element 4 through a pin hole plate 4b. The output of the light receiving element 4 is connected to the input of an amplifier 5, and the output of the amplifier 5 is connected to the input of a binary digitizing circuit 6. The output of the binary digitizing circuit 6 is connected the input of a decoding circuit 7, and the output of the decoding circuit 7 is connected to the output of the bar code reader. Meanwhile, the output of the amplifier 5 is connected to the input of a regular reflection detecting circuit 8, and the output of the regular reflection detecting circuit 8 is connected to the input of a controlling driving circuit 9. The output of the controlling driving circuit 9 is connected to the first and second light emitting elements 2-1 and 2-2. In this instance, the amplifier 5, the binary digitizing circuit 6 and the decoding circuit 7 constitute a signal processing section.

Figure 3A:
FIGS. 3(a) to 3(d) are signal waveform diagrams illustrating signals at several portions of the optical reading apparatus of FIG. 1 when a bar code is read.
Figure 3B:
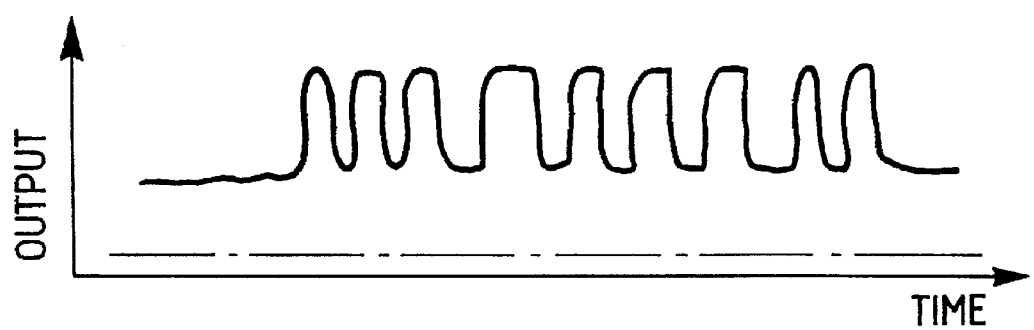
Figure 3C:
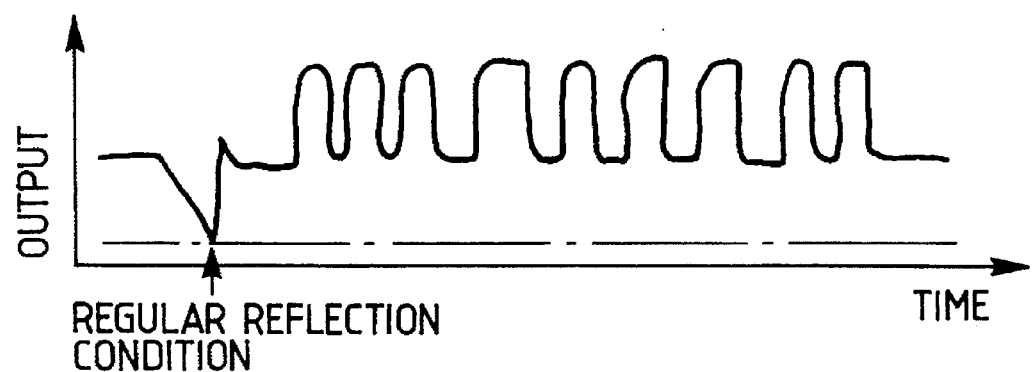
Figure 3D:
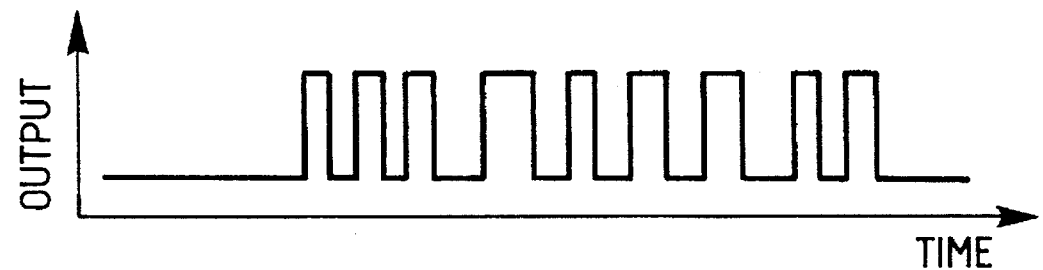

FIGS. 3(a) to 3(d) illustrate, in signal waveform diagram, signals at several portions of the bar code reader of the first embodiment described above when a bar code is read. In particular, FIG. 3(a) illustrates an example of a bar code pattern to be read; FIG. 3(b) illustrates a waveform of an amplified bar code read signal when no regular reflection condition occurs; FIG. 3(c) illustrates a waveform of an amplified bar code read signal when a regular reflection condition occurs; and FIG. 3(d) illustrates a waveform of a binary signal.

Operation of the bar code reader of the first embodiment will be described below with reference to FIGS. 3(a) to 3(d).

The first and second light emitting elements 2-1 and 2-2 are driven by the controlling driving circuit 9 such that normally only one of them is in an operative condition. For example, when only the first light emitting element 2-1 is in an operative condition, it generates intermittent light or continuous light at a predetermined timing. The light generated from the first light emitting element 2-1 is introduced to the reading portion (end portion) of the bar code reader by way of the optical transmission line 3-1. In this instance, if a user grasps the bar code reader in its hand and operates the bar code reader so that the reading portion (end portion) of the bar code reader is opposed to the information recording surface 1a on which the bar code 1 (the bar code 1 has such a pattern as shown, for example, in FIG. 3(a)) is printed, the light introduced from the first light emitting element 2-1 to the reading portion (end portion) of the bar code reader is irradiated upon and reflected from the information recording surface 1a on which the bar code 1 is printed. The reflected light is condensed by the lens 4a and supplied to the light receiving element 4 through a pin hole of the pin hole plate 4b. Upon such operation, the pin hole plate 4b performs scanning of the pin hole with respect to the light receiving element 4. Consequently, reflected light equivalent to that obtained when the information recording surface 1a on which the bar code 1 is printed is scanned along the portion of the information recording surface 1a at which the bar code 1 is formed is received by the light receiving element 4. When the reflected light is received, the light receiving element 4 generates a bar code read signal having an amplitude corresponding to the light amount of the reflected light. The bar code read signal is supplied to the signal processing section at the succeeding stage which is constituted from the amplifier 5, the binary digitizing circuit 6 and the decoding circuit 7. In the signal processing section, the bar code read signal is first amplified to a predetermined level by the amplifier 5 so that a bar code read signal of such a waveform as seen in FIG. 3(b) is obtained from the amplifier 5. The bar code read signal is then binary digitized by the binary digitizing circuit 6 so that a binary signal of such a waveform as seen in FIG. 3(d) is obtained from the binary digitizing circuit 6. The binary signal is decoded by the decoding circuit 7, and the thus decoded signal is outputted as a display signal from the bar code reader.

The bar code read signal obtained at the output side of the amplifier 5 is supplied also to the regular reflection detecting circuit 8, by which it is detected whether or not the bar code read signal exhibits occurrence of a regular reflection condition. Then, if the regular reflection detecting circuit 8 detects that the bar code read signal inputted thereto exhibits no occurrence of a regular reflection condition, for example, as seen from FIG. 3(b), the regular reflection detecting circuit 8 continuously supplies a regular reflection non-detection signal to the controlling driving circuit 9 while such detection continues. When the regular reflection non-detection signal is supplied to the controlling driving circuit 9, the controlling driving circuit 9 continues driving of that one of the light emitting elements which has been driven by the controlling driving circuit 9 until that time, here, driving of the first light emitting element 2-1, and consequently, the first light emitting element 2-1 continues its generation of intermittent light at the predetermined timing. On the other hand, if the regular reflection detecting circuit 8 detects from the bar code read signal inputted thereto that a reference level varies, at a first portion of the bar code read signal, by a great amount in the negative direction, for example, as seen in FIG. 3(c), that is, a regular reflection condition occurs, it immediately supplies a regular reflection detection signal to the controlling driving circuit 9. Upon reception of the regular reflection detection signal, the controlling driving circuit 9 stops driving of that one of the light emitting elements which has been driven until that time, here, driving of the first light emitting element 2-1, in order to eliminate the cause of occurrence of the regular reflection condition and simultaneously starts driving of the second light emitting element 2-2 to thus perform changing over between the light emitting elements. As a result of the changing over between the light emitting elements, generation of intermittent light or continuous light from the first light emitting element 2-1 is stopped while the second light emitting element 2-2 begins to generate intermittent light or continuous light at the predetermined timing. Consequently, the regular reflection condition having occurred with the bar code read signal is eliminated immediately as seen from FIG. 3(c), and a bar code read signal whose reference level does not exhibit a variation is obtained. Then, the bar code read signal thus obtained is binary digitized by the binary digitizing circuit 6 so that such a binary signal as seen in FIG. 3(d) is obtained from the binary digitizing circuit 6. The binary signal is decoded by the decoding circuit 7 and outputted as a display signal from the bar code reader.

FIG. 4 illustrates, in flow chart, the operations of detection of occurrence of a regular reflection condition and changing over between light emitting elements in the bar code reader of the first embodiment described above.

Principal operation of the bar code reader of the first embodiment will be described again with reference to the flow chart of FIG. 4.

First at step S1, only one of the light emitting elements, for example, only the first light emitting element 2-1, is driven under the control of the controlling driving circuit 9, and intermittent light at a predetermined timing is generated from the first light emitting element 2-1. The light is first reflected from the information recording surface 1a on which the bar code 1 is printed, and then supplied to the light receiving element 4.

Then at step S2, scanning with respect to the light receiving element 4 is started so that light obtained by scanning the information recording surface 1a on which the bar code 1 is printed is introduced into the light receiving element 4. Consequently, the light receiving element 4 generates a bar code read signal having an amplitude corresponding to the amount of light introduced into it. The bar code read signal is supplied to the signal processing section.

Then at step S3, the regular reflection detecting circuit 8 discriminates whether or not the bar code read signal amplified by the amplifier 5 is higher than a regular reflection detection level. If the regular reflection detecting circuit 8 discriminates that the bar code read signal is not higher than the regular reflection detection level (N), it outputs a regular reflection non-detection signal, whereafter the control sequence advances to step S4. On the contrary, if the regular reflection detecting circuit 8 discriminates that the bar code read signal is higher than the regular reflection detection level (Y), then it outputs a regular reflection detection signal, and the control sequence advances to another step S5.

At step S4, the controlling driving circuit 9 continues driving of the first light emitting element 2-1 in response to reception of the regular reflection non-detection signal.

On the other hand, at step S5, in response to reception of the regular reflection detection signal, the controlling driving circuit 9 stops driving of the first light emitting element 2-1 and starts driving the second light emitting element 2-2 instead.

At step S6 subsequently to step S4 or S5, scanning with respect of the light receiving element 4 is stopped.

Subsequently at step S7, the decoding circuit 7 decodes the binary signal from the binary digitizing circuit 6 to generate a display signal.

In this manner, with the bar code reader of the first embodiment of the present invention, when a regular reflection condition occurs with one of the light emitting elements which is in use, for example, with the first light emitting element 2-1, the regular reflection detecting circuit 8 detects the occurrence of the regular reflection condition and changes over the light emitting element to be used to the other light emitting element, for example, to the second light emitting element 2-2. Consequently, the regular reflection condition is eliminated immediately. Accordingly, processing of a bar code read signal can be performed normally in a regular condition free from occurrence of a regular reflection condition, and there is no necessity of repetitively performing a reading operation of a bar code as a result of occurrence of a regular reflection condition.

It is to be noted that, while, in the first embodiment described above, the first and second light emitting elements 2-1 and 2-2 are employed as the light emitting elements, the number of light emitting elements which can be used in the present embodiment is not limited to two, and three or more light emitting elements may otherwise be employed.

In this instance, where three light emitting elements, for example, first, second and third light emitting elements, are employed, one of the three light emitting elements, for example, the first light emitting element, is normally used, and if occurrence of a regular reflection condition is detected during use of the first light emitting element, the light emitting element to be used is changed over from the first light emitting element to the second light emitting element or the third light emitting element. This similarly applies to another other case wherein four or more light emitting elements are employed.

Figure 5:
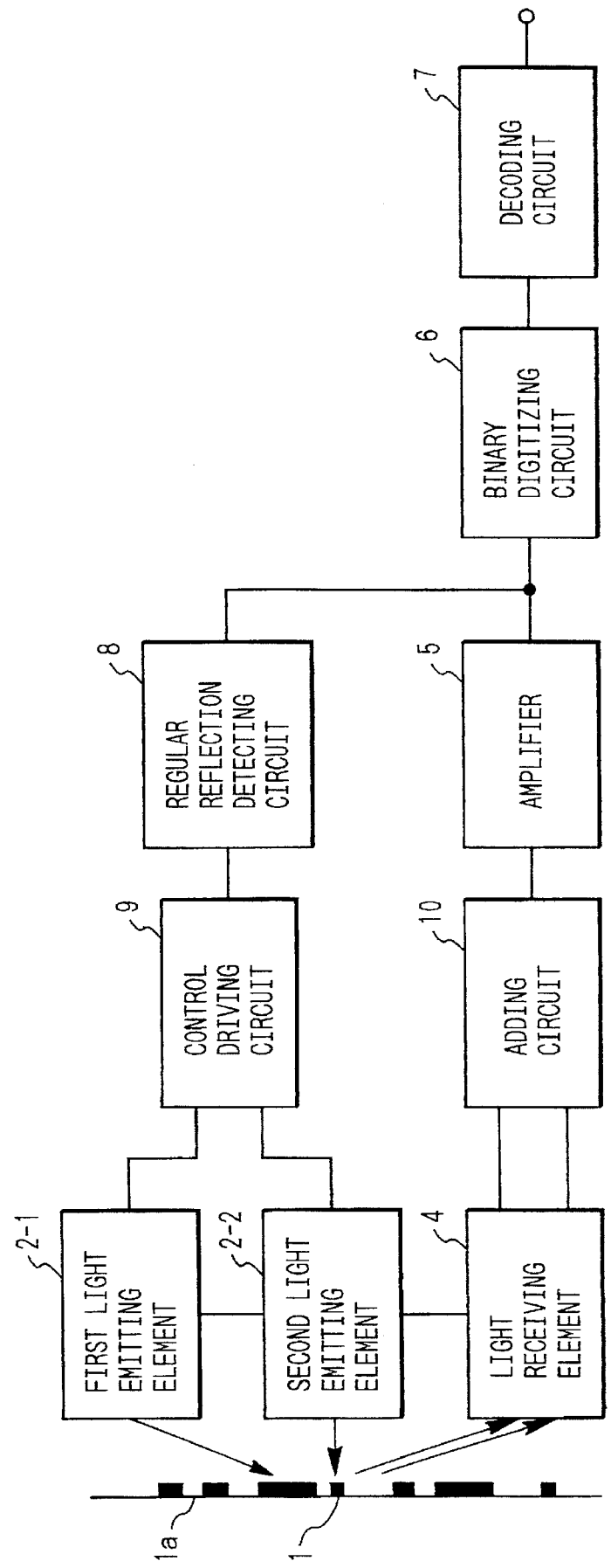
FIG. 5 is a block diagram of another optical reading apparatus showing a second preferred embodiment of the present invention.

FIG. 5 shows, in block diagram, an optical reading apparatus according to a second preferred embodiment of the present invention. Also in this instance, the optical reading apparatus is constructed as a bar code reader. In FIG. 5, like elements to those of FIG. 1 are denoted by like reference characters.

The bar code reader of the second embodiment is different in construction from the bar code reader of the first embodiment only in that the light receiving element 4 does not output one bar code read signal but outputs two bar code read signals corresponding to two reflected light beams inputted thereto, that the light receiving element 4 and the amplifier 5 are not coupled directly to each other, but an adding circuit 10 is connected between the light receiving element 4 and the amplifier 5, and that the controlling driving circuit 9 does not drive one of the light emitting elements, but normally drives the first and second light emitting elements 2-1 and 2-2 simultaneously. Further, in the second embodiment, the amplifier 5, the binary digitizing circuit 6, the decoding circuit 7 and the adding circuit 10 constitute a signal processing section.

The bar code reader of the second embodiment having the construction described above operates in the following manner.

First, the first and second light emitting elements 2-1 and 2-2 are driven simultaneously under the control of the controlling driving circuit 9 so that intermittent light beams are generated simultaneously at a predetermined timing from the first to second light emitting elements 2-1 to 2-2. The two light beams are irradiated upon the information recording surface 1a printed on the bar code 1 and then introduced as two reflected light beams individually into the light receiving element 4. In this instance, the light receiving element 4 generates two bar code read signals corresponding to the two reflected light beams inputted thereto, and supplies the two bar code read signals to the two inputs of the adding circuit 10. The adding circuit 10 simply adds the two bar code read signals to generate a single added bar code read signal. The added bar code read signal is converted into a binary signal by the binary digitizing circuit 6 and then decoded by the decoding circuit 7 so that it is outputted as a display signal from the bar code reader. The added bar code read signal from the adding circuit 10 is supplied also to the regular reflection detecting circuit 8, by which it is detected whether or not a regular reflection condition occurs with the added bar code read signal. If the regular reflection detecting circuit 8 detects that a regular reflection signal does not occur with the added bar code read signal, then it supplies a regular reflection non-detection signal to the controlling driving circuit 9. On the contrary, if the regular reflection detecting circuit 8 detects that a regular reflection condition occurs with the added bar code read signal, it supplies a regular reflection detection signal to the controlling driving circuit 9. If a regular reflection non-detection signal is supplied to the controlling driving circuit 9, then the controlling driving circuit 9 continues to drive the first and second light emitting elements 2-1 to 2-2 simultaneously. On the contrary, if a regular reflection detection signal is supplied, then the controlling driving circuit 9 stops driving of the first to second light emitting elements 2-1 to 2-2 one by one in order. In this instance, if the regular reflection condition of the added bar code read signal is eliminated when driving of the first light emitting element 2-1 is stopped, then the controlling driving circuit 9 stops driving of the first light emitting element 2-1 for a fixed period of time, for example, for a time while reading of the bar code continues. On the other hand, if the regular reflection condition of the added bar code read signal is not eliminated even if driving of the first light emitting element 2-1 is stopped, driving the first light emitting element 2-1 is resumed while driving of the second light emitting element 2-2 is stopped instead. If the regular reflection condition of the added bar code read signal is eliminated as a result of the stopping of driving of the second light emitting element 2-2, then driving of the second light emitting element 2-2 is stopped for the fixed period of time, for example, for a time while reading of the bar code continues similarly as above. Consequently, the regular reflection condition of the added bar code read signal is eliminated in a comparatively short time.

It is to be noted that, while, in the second embodiment described above, the first and second light emitting elements 2-1 to 2-2 are employed as the light emitting elements, the number of light emitting elements which can be employed in the present embodiment is not limited to two, and three or more light emitting elements may otherwise be employed.

Further, the bar code reader of the second embodiment may be modified such that, when driving of one of the plurality of light emitting elements is stopped, the driving voltage to the remaining light emitting element or elements is raised a little so that the amplitude of the added bar code read signal may be substantially fixed before and after driving of the one light emitting element is stopped.

In this manner, with the bar code reader of the second embodiment, if a regular reflection condition occurs with one of the plurality of light emitting elements 2-1 and 2-2 while all of the light emitting elements are used, the regular reflection detecting circuit 8 detects the occurrence of the regular reflection condition from the added bar code read signal, and driving of the one light emitting element is stopped. In this manner, since the plurality of light emitting elements 2-1 to 2-2 are successively stopped from driving one by one in order until the regular reflection condition of the added bar code read signal is eliminated, the thus occurred regular reflection condition is eliminated in a comparatively short time. Accordingly, processing of a bar code read signal can be performed normally in a regular condition free from occurrence of a regular reflection condition, and there is no necessity of repetitively performing a reading operation of a bar code as a result of occurrence of a regular reflection condition.

Further, with the bar code reader of the second embodiment, since the light receiving element 4 generates a plurality of bar code read signals in response to simultaneous irradiation of light beams from the plurality of light emitting elements 2-1 and 2-2 and signal processing such as generation of a binary signal, detection of a regular reflection condition and so forth is performed using an added bar code read signal obtained by addition of the bar code read signals generated from the light receiving element 4, the signal processing can be performed with a high sensitivity.

Figure 6:
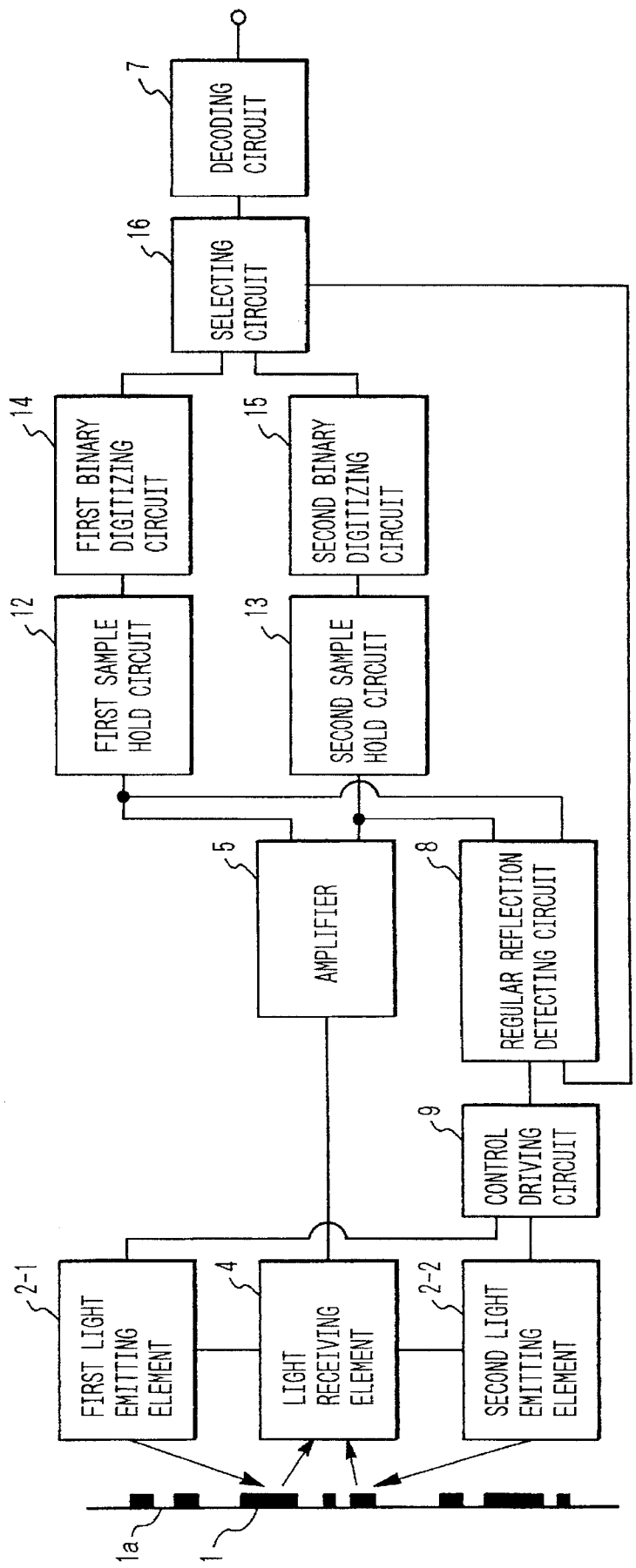
FIG. 6 is a block diagram of a further optical reading apparatus showing a third preferred embodiment of the present invention.

FIG. 6 shows, in block diagram, an optical reading apparatus according to a third preferred embodiment of the present invention. Also the optical reading apparatus of the present embodiment is constructed as a bar code reader. Further, also in FIG. 6, like elements to those of FIG. 1 are denoted by like reference characters.

The bar code reader of the third embodiment is different in construction from the bar code reader of the first embodiment only in that first and second sample hold circuits 12 and 13 are newly connected to the output side of the amplifier 5, that, in place of the provision of the binary digitizing circuit 6, first and second binary digitizing circuits 14 and 15 are connected to the output sides of the first and second sample hold circuits 12 and 13, respectively, and besides a selecting circuit 16 for selecting a decoded signal is provided between the outputs of the first and second binary digitizing circuits 14 and 15 and the decoding circuit 7, that the input of the regular reflection detecting circuit 8 is not connected to the output side of the amplifier 5 but two inputs of the regular reflection detecting circuit 8 are connected to the output sides of the first sample hold circuit 12 and the second sample hold circuit 13, and that the controlling driving circuit 9 does not drive one of the light emitting elements but normally drives both of the first and second light emitting elements 2-1 and 2-2 so that the first and second light emitting elements 2-1 and 2-2 may generate intermittent light beams at different timings from each other. Here, in the third embodiment, the amplifier 5, the decoding circuit 7, the first and second sample hold circuits 12 and 13, the first and second binary digitizing circuits 14 and 15 and the selecting circuit 16 constitute a signal processing section.

FIGS. 7(a) to 7(h) are signal waveform diagrams illustrating signals at several portions of the bar code reader of the third embodiment when a bar code is read. In particular, FIG. 7(a) shows an example of a bar code pattern to be read; FIG. 7(b) shows an output waveform of intermittent light generated from the first light emitting element 2-1; FIG. 7(c) shows an output waveform of intermittent light generated from the second light emitting element 2-2; FIG. 7(d) shows an output signal waveform of the amplifier 5, FIG. 7(e) shows an output waveform of the first sample hold circuit 12; FIG. 7(f) shows an output waveform of the second sample hold circuit 13; FIG. 7(g) shows a binary signal waveform of the first binary digitizing circuit 14; and FIG. 7(h) shows a binary signal waveform of the second binary digitizing circuit 15. In this instance, FIGS. 7(a) to 7(h) illustrate a manner wherein a regular reflection condition occurs with the second light emitting element 2-2 side within a period delineated by two broken lines (period from time t1 to time t2).

Operation of the bar code reader of the third embodiment will be described below with reference to FIG. 7.

Figure 7:
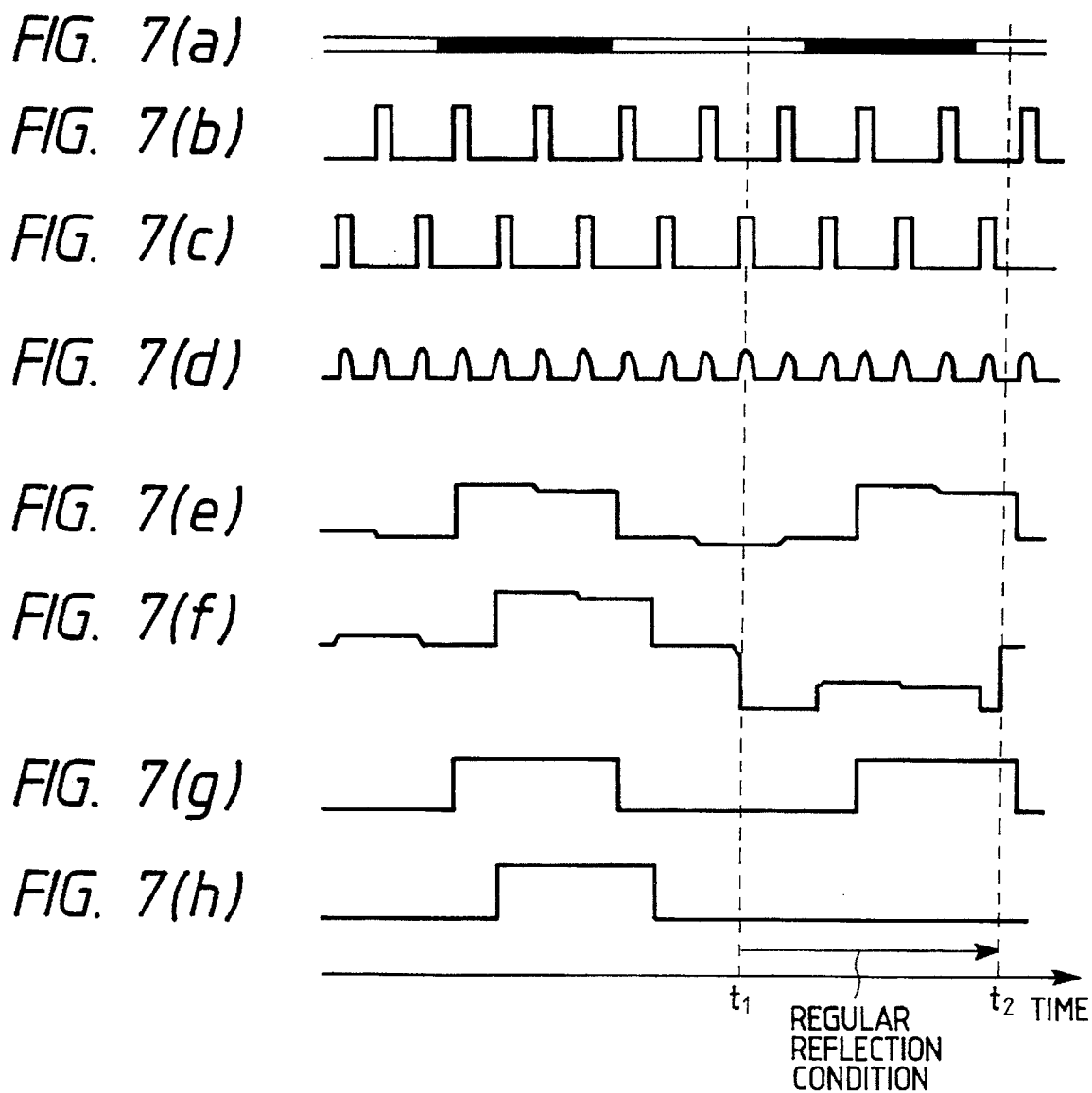
FIGS. 7(a) to 7(h) are signal waveform diagrams illustrating signals at several portion of the optical reading apparatus of FIG. 6 when a bar code is read.

First, under the control of the controlling driving circuit 9, both of the first and second light emitting elements 2-1 and 2-2 are driven so that intermittent light beams are generated at different timings from each other from the first and second light emitting elements 2-1 and 2-2 as seen from the waveforms (b) and (c) of FIG. 7 and are individually irradiated upon the information recording surface 1a on which the bar code 1 is printed. The thus irradiated light beams are reflected by the information recording surface 1a on which the bar code 1 is printed and are introduced into the light receiving element 4. The light receiving element 4 generates a bar code read signal corresponding to the reflected light beams introduced into it. The bar code read signal is supplied to the amplifier 5, by which it is amplified to a predetermined level. The bar code read signal has such a form wherein reflected light beams of intermittent light beams generated from the two first and second light emitting elements 2-1 and 2-2 are combined alternately with respect to time as seen from the curve (d) of FIG. 7. The bar code read signal amplified by the amplifier 5 is supplied to the first and second sample hold circuits 12 and 13, by which they are sample held at the generation timings of the intermittent light beams from the first and second light emitting elements 2-1 and 2-2. Consequently, such first and second sample hold signals as seen from the curves (e) and (f) of FIG. 7 are obtained from the first and second sample hold circuits 12 and 13, respectively. The first and second sample hold signals are supplied to the first and second binary digitizing circuits 14 and 15, by which they are converted into first and second binary signals as seen from the curves (g) and (h) of FIG. 7, respectively. The first and second binary signals are supplied to the selecting circuit 16, by which one of them is selected. The thus selected binary signal is supplied to and decoded by the decoding circuit 7 and then outputted as a display signal from the bar code reader.

In this instance, the bar code read signals obtained on the output sides of the first and second sample hold circuits 12 and 13 are supplied also to the regular reflection detecting circuit 8, by which it is detected whether or not a regular reflection condition occurs with each of the bar code signals. If the regular reflection detecting circuit 8 detects that a regular reflection condition does not occur with any of the bar code read signals like the time before the time t1 or after the time t2 shown in FIGS. 7(a) to 7(h), it supplies a regular reflection non-detection signal to the controlling driving circuit 9 and the selecting circuit 16. On the other hand, if the regular reflection detecting circuit 8 detects that a regular reflection condition occurs with any of the bar code read signals like the time between the times t1 and t2 shown in FIGS. 7(a) to 7(h), it supplies a regular reflection detection signal to the controlling driving circuit 9 and the selecting circuit 16.

If a regular reflection non-detection signal is supplied to the controlling driving circuit 9, then the controlling driving circuit 9 continues to drive both of the first and second light emitting elements 2-1 and 2-2. On the other hand, if a regular reflection detection signal is supplied to the controlling driving circuit 9, then the controlling driving circuit 9 discriminates, from the timing at which the regular reflection condition occurs, with which one of the first and second light emitting elements 2-1 and 2-2 the regular reflection condition occurs. Then, the controlling driving circuit 9 immediately stops driving of that one of the light emitting elements with which the regular reflection condition occurs, in the example shown in FIG. 7, driving of the second light emitting element 2-2, and keeps the stopping condition of driving of the second light emitting element 2-2 for a fixed period of time, for example, while reading of the bar code continues, thereby eliminating the occurrence of the regular reflection condition. Meanwhile, if the regular reflection non-detection signal is supplied to the selecting circuit 16, then the selecting circuit 16 continues to supply the formerly selected one of the first and second binary signals to the decoding circuit 7. On the other hand, if a regular reflection detection signal is supplied, the selecting circuit 16 stops selection of the binary signal obtained from the intermittent light from that one of the light emitting elements with which the regular reflection condition occurs, in the example shown in FIG. 7, selection of the second binary signal obtained from the intermittent light from the second light emitting element 2-2. In particular, when the first binary signal has been selected until that time, the selecting circuit 16 continues selection of the first binary signal and supplies the first binary signal to the decoding circuit 7, but when the second binary signal has been selected until that time, the selecting circuit 16 stops selection of the second binary signal and newly selects the first binary signal so that the first binary signal is supplied to the decoding circuit 7.

It is to be noted that, while, in the third embodiment described above, the first and second light emitting elements 2-1 and 2-2 are employed as the light emitting elements, the number of light emitting elements which can be employed in the present embodiment is not limited to two, and three or more light emitting elements which generates intermittent light beams at different timings from each other may otherwise be employed.

Further, the bar code reader of the third embodiment may be modified such that, when driving of one of the plurality of light emitting elements is stopped, the driving voltage to the remaining light emitting element or elements is raised a little.

In this manner, with the bar code reader of the third embodiment, the plurality of first and second light emitting elements 2-1 and 2-2 which generate intermittent light beams at different timings from each other, and when a regular reflection condition occurs with one of the light emitting elements, the regular reflection detecting circuit 8 detects the occurrence of the regular reflection condition from the bar code read signal and the controlling driving circuit 9 immediately stops, from the generation timing of the regular reflection condition, driving of the light emitting element with which the regular reflection condition occurs while another binary signal which is free from an influence of the regular reflection condition is decoded. Consequently, the regular reflection condition thus occurred is detected in a very short time. Accordingly, processing of a bar code read signal can be performed normally in a regular condition free from occurrence of a regular reflection condition, and there is no necessity of repetitively performing a reading operation of a bar code as a result of occurrence of a regular reflection condition.

Figure 8:
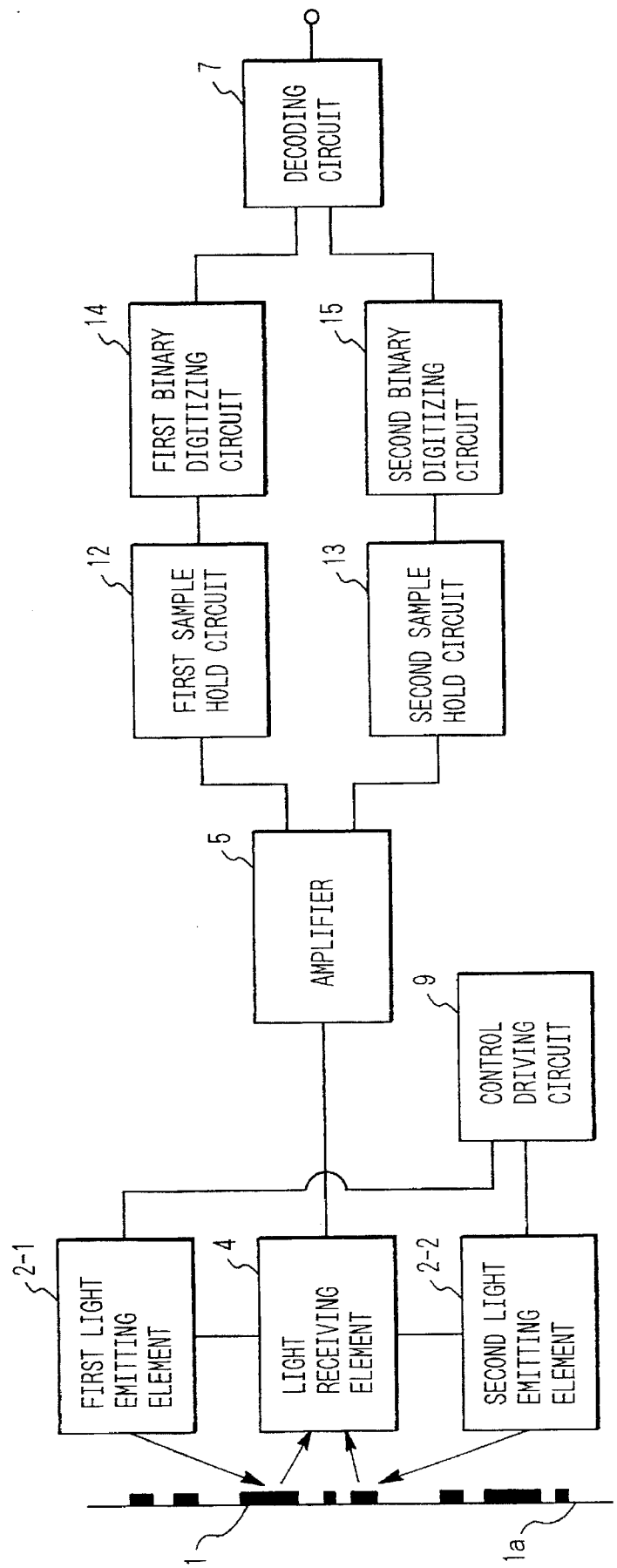
FIG. 8 is a block diagram of a still further optical reading apparatus showing a fourth preferred embodiment of the present invention.

FIG. 8 shows, in block diagram, an optical reading apparatus according to a fourth preferred embodiment of the present invention. Also the optical reading apparatus of the present embodiment is constructed as a bar code reader. Also in FIG. 8, like elements to those of FIG. 6 are denoted by like reference characters.

The bar code reader of the fourth embodiment is different in construction from the bar code reader of the third embodiment only in that the decoding circuit 7 is not connected to the output sides of the first and second binary digitizing circuits 14 and 15 by way of the selecting circuit 16 but connected directly to the output sides of the first and second binary digitizing circuits 14 and 15, and that the decoding circuit 7 not only has the function of decoding a binary signal but also has another function of discriminating, upon such decoding of a binary signal, whether or not decoding has been performed accurately. In this instance, in the fourth embodiment, the amplifier 5, the decoding circuit the first and second sample hold circuits 12 and 13, and the first and second binary digitizing circuits 14 and 15 constitute a signal processing section.

The bar code reader of the fourth embodiment is principally different in operation from the bar code reader of the third embodiment only in that, while, in the third embodiment, one of first and second binary signals obtained from the first and second binary digitizing circuits 14 and 15 is selected by the selecting circuit 16 and the thus selected binary signal is decoded by the decoding circuit 7 and outputted as a display signal, in the fourth embodiment, first and second binary signals obtained from the first and second binary digitizing circuits 14 and 15 are individually decoded by the decoding circuit 7 and the decoding circuit 7 selects one of the two binary signals which has been decoded accurately and outputs the thus selected binary signal as a display signal. Since the other operation of the bar code reader of the present embodiment is almost same as that of the bar code reader of the third embodiment described above, description thereof is omitted herein to avoid redundancy.

Operation of the decoding circuit 7 in the bar code reader of the fourth embodiment will be described in more detail here. When the decoding circuit 7 decodes first and second binary signals successively supplied thereto in order, it stores the thus decoded binary signals once into an internal memory not shown thereof, and then if it detects that one of the two binary signals, for example, the second binary signal, has not been decoded accurately because of occurrence of a regular reflection condition, it reads out the decoded first binary signal stored in the internal memory and outputs the decoded first binary signal as a display signal. Or, the decoding circuit 7 decodes first and second binary signals successively inputted thereto individually at a high speed, and if it detects that one of the two thus decoded binary signals, for example, the second binary signal, has not been decoded accurately because of occurrence of a regular reflection condition, then it extracts the first binary signal which has been decoded accurately and outputs the first binary signal as a display signal.

It is to be noted that, while, in the fourth embodiment described above, the first and second light emitting elements 2-1 and 2-2 are employed as the light emitting elements and the first and second sample hold circuits 12 and 13 and the first and second binary digitizing circuits 14 and 15 are employed as the sample hold circuits and the binary digitizing circuits corresponding to the light emitting elements, respectively, the number of light emitting elements and the numbers of sample hold circuits and binary digitizing circuits which can be employed in the present embodiment are not individually limited to two, and three or more light emitting elements which generate intermittent light beams at different timings from each other and three or more sample hold circuits and binary digitizing circuits corresponding to the light emitting elements may otherwise be employed.

In this manner, with the bar code reader of the fourth embodiment, since a plurality of binary signals obtained in accordance with the arrangement of the plurality of light emitting elements are successively decoded by the decoding circuit 7 and one of the binary signals obtained by such decoding which has been coded accurately is selectively outputted as a display signal, even if a regular reflection condition occurs with the plurality of light emitting elements, one of the binary signals which has been decoded accurately can be selectively outputted as a display signal without fail. Consequently, there is no necessity of repetitively performing a reading operation of a bar code even if a regular reflection condition occurs.

Figure 9:
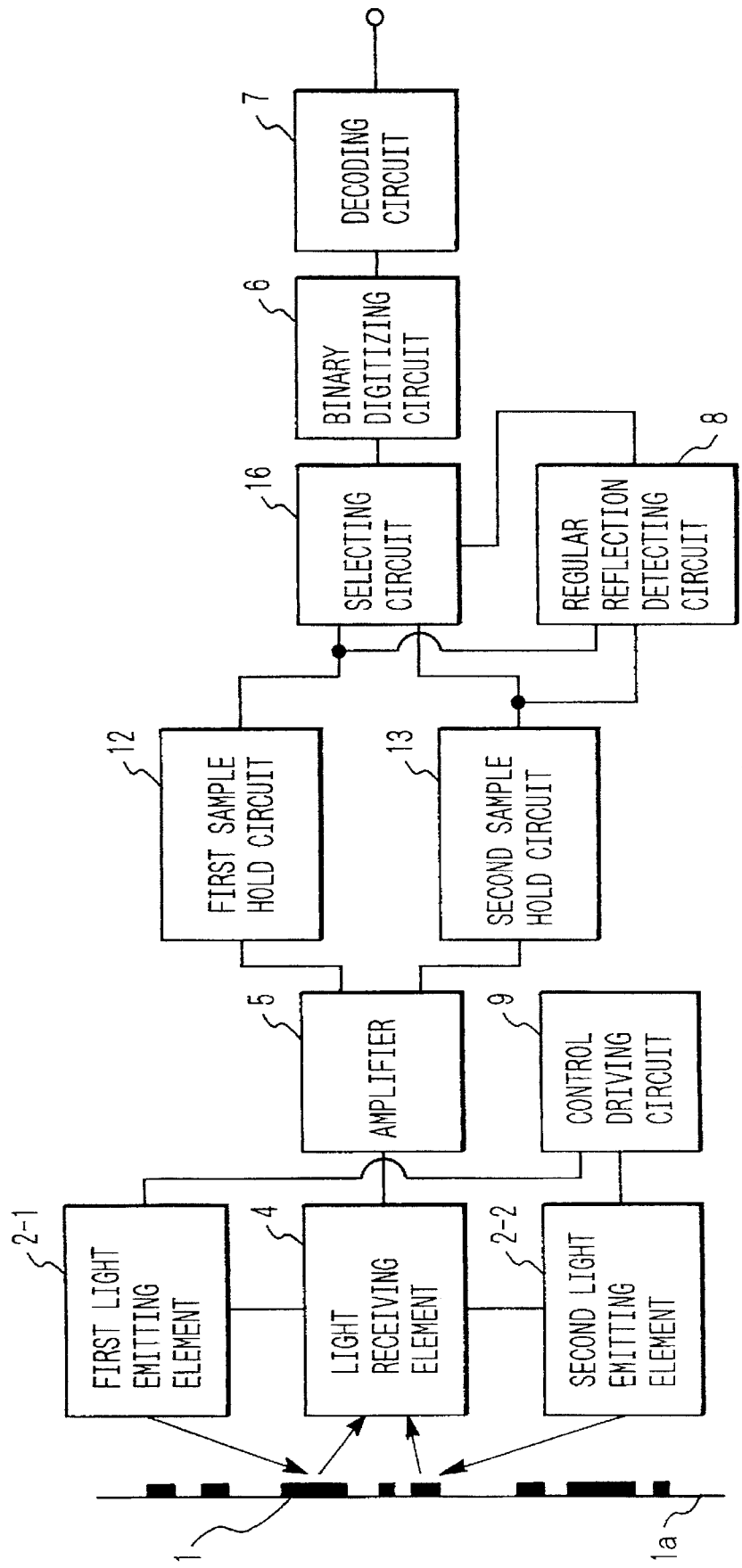
FIG. 9 is a block diagram of a yet further optical reading apparatus showing a fifth preferred embodiment of the present invention.
Figure 10:
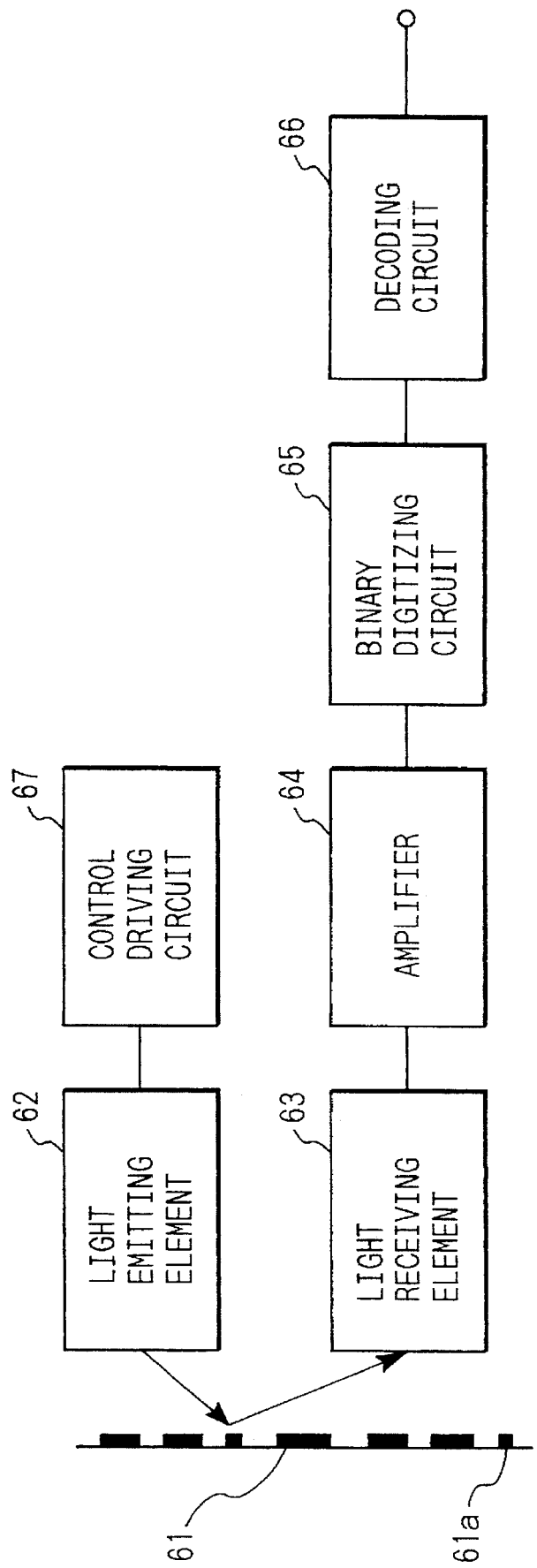
FIG. 10 is a block diagram showing an example of a construction of a known bar code reader.
Figure 11:
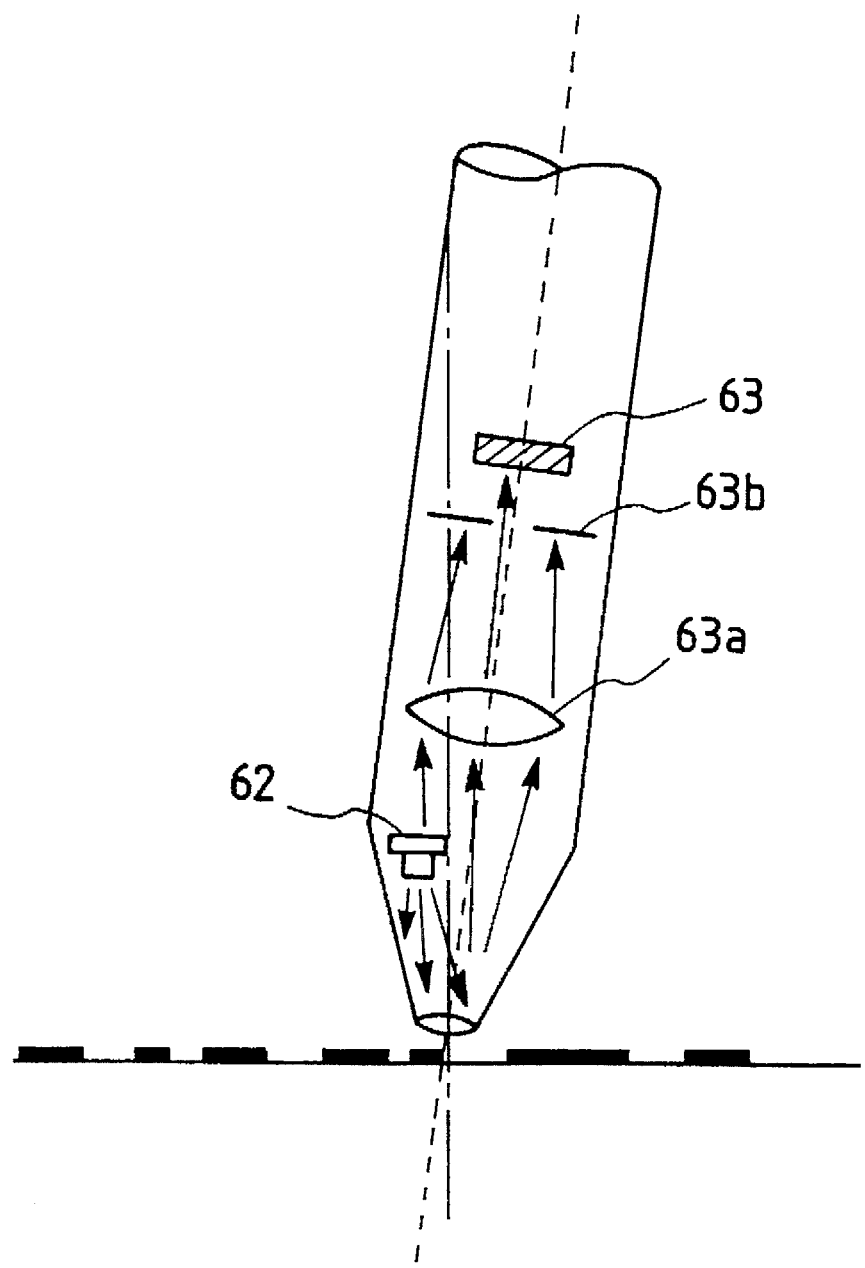
FIG. 11 is a schematic sectional view showing a known bar code reader during use.
Figure 12A:
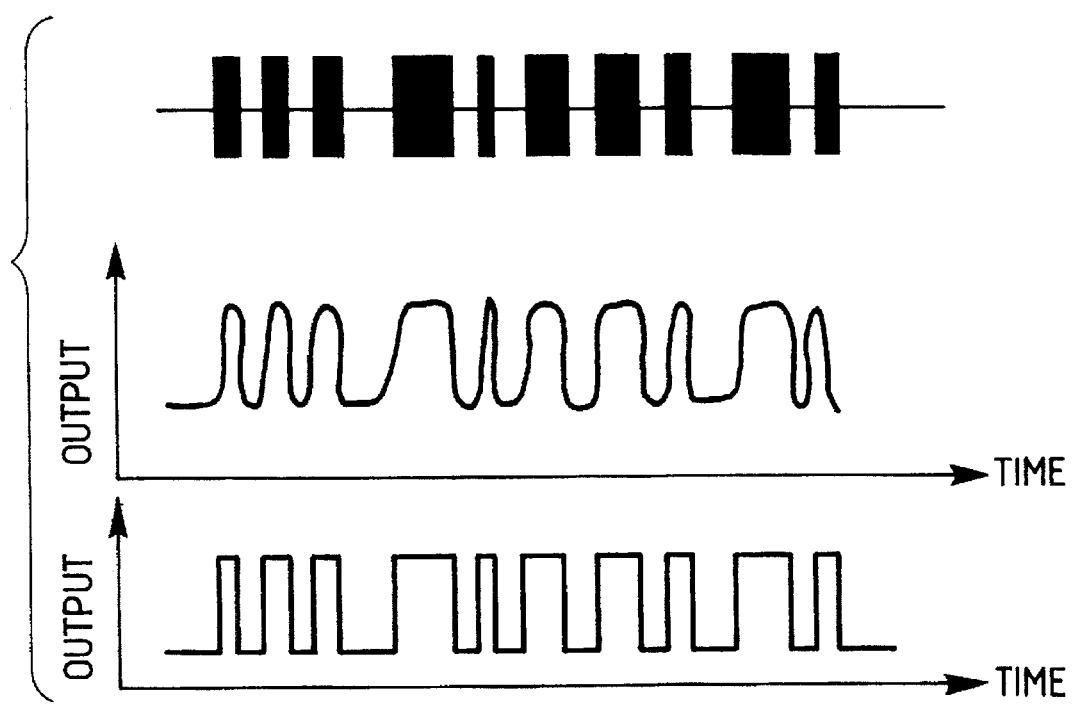
FIGS. 12(a) and 12(b) are signal waveform diagrams illustrating signals at several portions of the known optical reading apparatus of FIG. 11 when a bar code is read.
Figure 12B:
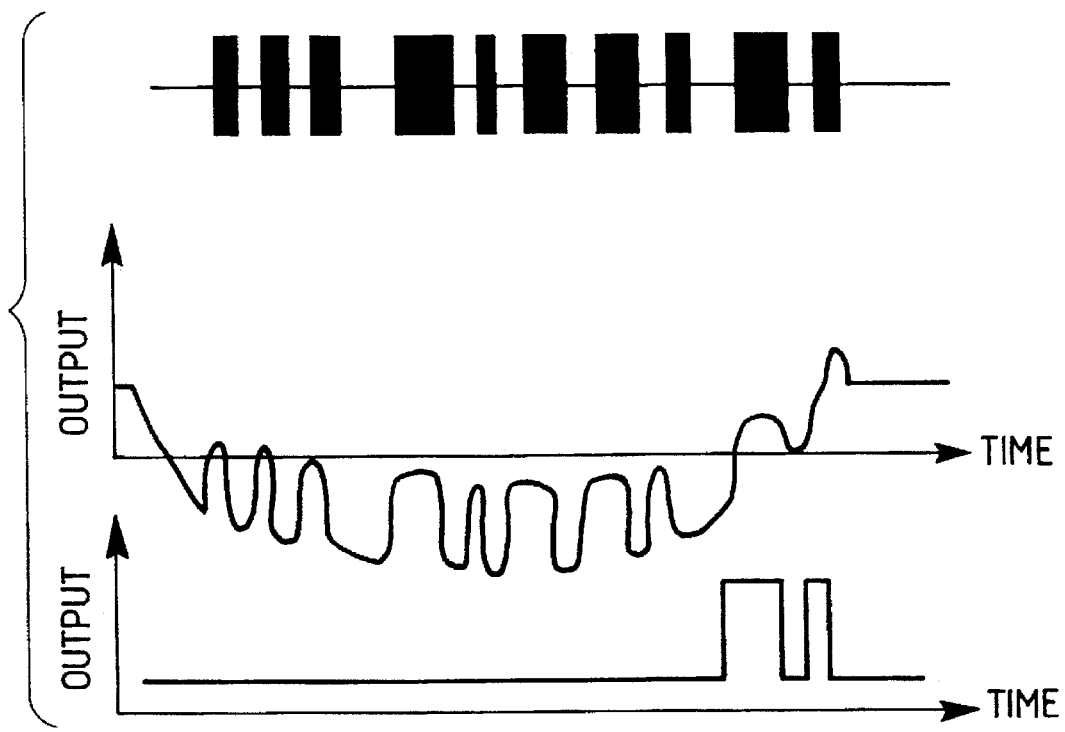

FIG. 9 shows, in block diagram, an optical reading apparatus according to a fifth preferred embodiment of the present invention. Also the optical reading apparatus of the present embodiment is constituted as a bar code reader. In FIG. 9, like elements to those of FIG. 6 are denoted by like reference characters.

The bar code reader in the fifth embodiment is different in construction from the bar code reader in the third embodiment only in that the selecting circuit 16 is connected not by way of the first and second binary digitizing circuits 14 and 15 to the output sides of the first and second sample hold circuits 12 and 13, respectively, but directly to the output sides of the first and second binary digitizing circuits 14 and 15, and that, the output of the regular reflection detecting circuit 8 is not connected to both of the input of the controlling driving circuit 9 and the control terminal of the selecting circuit 16 but connected only to the control terminal of the selecting circuit 16. In this instance, in the fifth embodiment, the amplifier 5, the binary digitizing circuit 6, the decoding circuit 7, and the first and second sample hold circuits 12 and 13 constitute a signal processing section.

The bar code reader of the fifth embodiment having the construction described above operates in the following manner.

Under the control of the controlling driving circuit 9, both of the first and second light emitting elements 2-1 and 2-2 are driven so that intermittent light beams are generated at predetermined different timings from each other from the first and second light emitting elements 2-1 and 2-2 and irradiated upon the information recording surface 1a on which bar code 1 is printed. The thus irradiated light beams are reflected from the information recording surface 1a on which the bar code 1 is printed and are inputted to the light receiving element 4. The light receiving element 4 generates bar code read signals in response to the reflected light beams thus inputted thereto, and the bar code read signals are supplied to the amplifier 5, by which they are amplified to a required level. The thus amplified bar code read signals are supplied to the first and second sample hold circuits 12 and 13, by which they are sample held in response to the generation timings of the intermittent light beams from the first and second light emitting elements 2-1 and 2-2 so that first and second sample hold signals are obtained from the first and second sample hold circuits 12 and 13, respectively. Then, the first and second sample hold signals are supplied to the selecting circuit 16, by which one of them is selected. The thus selected sample hold signal is supplied to the binary digitizing circuit 6, by which it is converted into a binary signal. Then, the binary signal is supplied to and decoded by the decoding circuit 7 and outputted as a display signal from the bar code reader.

In this instance, the first and second sample hold signals obtained on the output sides of the first and second sample hold circuits 12 and 13 are supplied also to the regular reflection detecting circuit 8, by which it is detected whether or not a regular reflection condition occurs. If the regular reflection detecting circuit 8 detects that no regular reflection condition occurs with the first and second sample hold signals, it supplies a regular reflection non-detection signal to the selecting circuit 16. However, if the regular reflection detecting circuit 8 detects that a regular reflection condition occurs with any of the first and second sample hold signals, it supplies a regular reflection detection signal to the selecting circuit 16. If a regular reflection non-detection signal is supplied to the selecting circuit 16, the selecting circuit 16 continues to supply that one of the first and second sample hold signals which has been supplied until that time. On the other hand, if a regular reflection detection signal is supplied to the selecting circuit 16 as a result of occurrence of a regular reflection condition with one of the first and second sample hold signals, for example, the second sample hold signal, then when the first sample hold signal has been selected until that time, the selecting circuit 16 continues to select the first sample hold signal and supply the first sample hold signal to the binary digitizing circuit 6, but on the contrary when the second sample hold signal has been selected until that time, the selecting circuit 16 stops selection of the second sample hold signal and newly selects and supplies the first sample hold signal to the binary digitizing circuit 6.

It is to be noted that, while, in the fifth embodiment described above, the first and second light emitting elements 2-1 and 2-2 are employed as the light emitting elements and the first and second sample hold circuits 12 and 13 are employed corresponding to the light emitting elements, respectively, the number of light emitting elements and the number of sample hold circuits which can be employed in the present embodiment are not individually limited to two, and three or more light emitting elements which generate intermittent light beams at different timings from each other and three or more sample hold circuits corresponding to the light emitting elements may otherwise be employed.

In this manner, in the bar code reader of the fifth embodiment, since the plurality of light emitting elements 2-1 and 2-2 which generate intermittent light beams at different timings from each other are employed and, when a regular reflection condition occurs with one of the light emitting elements, the regular reflection detection circuit 8 detects the occurrence of the regular reflection condition from the first and second sample hold signals, and one of the sample hold signals which is not influenced by the regular reflection condition is binary digitized and then decoded, a required display signal can normally be extracted without being influenced by the regular reflection condition which occurs actually.

Further, in the bar code reader of the fifth embodiment, if occurrence of a regular reflection condition is detected during reading of a bar code, then reading of the bar code must be performed again. However, such re-reading of the bar code is required to perform only once, and there is no need of performing reading of the bar code repetitively by a plurality of times.

While the optical reading apparatus in the embodiments described above are each constructed as a bar code reader, the optical reading apparatus according to the present invention is not limited to a bar code reader, but may be applied to any other similar apparatus only if it reads a linear recording medium like a bar code.

In summary, in the optical reading apparatus of the first to fifth embodiments described above, the regular reflection detecting circuit 8 supplies a regular reflection detection signal, which is obtained when occurrence of a regular reflection condition is detected, to the controlling driving circuit 9 and the controlling driving circuit 9 controls driving of the plurality of first and second light emitting elements 2-1 and 2-2 in a driving manner, which is different whether or not a regular reflection detection signal is supplied to the controlling driving circuit 9, to eliminate the occurrence of the regular reflection condition. More particularly, when a regular reflection detection signal is not supplied, the controlling driving circuit 9 drives only one of the plurality of light emitting elements 2-1 to 2-2, but when a regular condition detection signal is supplied, the controlling driving circuit 9 drives another one of the light irradiation sections different from the one light irradiation section, to eliminate the occurrence of the regular reflection condition, or when a regular reflection detection signal is not supplied, the controlling driving circuit 9 drives all of the plurality of light emitting elements 2-1 to 2-2, but when a regular reflection detection signal is supplied, the controlling driving circuit 9 stops driving of the plurality of light emitting elements 2-1 to 2-2 one by one in order until occurrence of the regular reflection condition is detected no more, to eliminate the occurrence of the regular reflection condition, or else, when a regular reflection detection signal is not supplied, the controlling driving circuit 9 drives the plurality of light emitting elements 2-1 and 2-2 intermittently at different timings from each other, but when a regular reflection detection signal is supplied, the controlling driving circuit 9 immediately stops driving of that one of the light emitting elements with which the regular reflection condition occurs to eliminate the occurrence of the regular reflection condition.

Thus, with the optical reading apparatus of the embodiments described above, since the controlling driving circuit 9 drives the plurality of light emitting elements 2-1 to 2-2 suitably such that, when occurrence of a regular reflection condition is detected by the regular reflection detecting circuit 8, the occurrence of the regular reflection condition may be eliminated, there is an advantage in that reading of a linear recording medium to generate a display signal is not disabled at all irrespective of whether or not a regular reflection condition occurs and accurate reading of the linear recording medium can be performed immediately.

Further, in the optical reading apparatus of some of the embodiments described above, the plurality of light emitting elements 2-1 and 2-2 irradiate intermittent beams of light at different timings from each other, and the signal processing sections 5 to 7 and 11 to 16 have a plurality of conversion processing routes for individually performing conversion processing of a plurality of recording medium read signals obtained individually for the plurality of light emitting elements and selectively extract and output, as a display signal, one of recording medium read signals obtained by conversion processing by the plurality of conversion processing routes which is in a good condition. More particularly, when the plurality of recording medium read signals are decoded, one of the recording medium read signals which has been decoded regularly is selectively extracted and outputted as a display signal, or occurrence of one of the plurality of recording medium read signals with which a regular reflection condition occurs is detected, and another one of the plurality of recording medium read signals with which occurrence of a regular reflection condition is not detected is selectively extracted and outputted as a display signal.

Thus, with the optical reading apparatus, there is an advantage in that, since that one of the plurality of recording medium read signals which is in a good condition is selectively extracted and outputted, reading of a linear recording medium to generate a display signal is not disabled at all irrespective of whether or not a regular reflection condition occurs and accurate reading of the linear recording medium can be performed immediately.

Having now fully described the invention, it will be apparent to one of ordinary skill in the art that many changes and modifications can be made thereto without departing from the spirit and scope of the invention as set forth herein.

What is claimed is:

1. An optical reading apparatus for reading a linear recording printed on an information recording surface, the optical reading apparatus comprising:

a plurality of light emitting elements for emitting light beams in different directions toward the information recording surface;

a light receiving element for receiving reflected light from the information recording surface and for generating a recording read signal;

a signal processing section for converting the recording read signal from said light receiving element into a display signal;

a controlling driving section for driving said plurality of light emitting elements; and a regular reflection detection section for detecting an occurrence of a regular reflection condition from the recording read signal and for transmitting a regular reflection detection signal upon such detection to said driving controlling section;

wherein said driving controlling section terminates driving of a first light emitting element of said plurality of light emitting elements in response to the regular reflection detection signal when the light beam emitted from the first light emitting element causes the occurrence of the regular reflection condition, and drives a second light emitting element of the plurality of light emitting elements, thereby eliminating the occurrence of the regular reflection condition.

2. An optical reading apparatus according to claim 1, wherein when the regular reflection detection signal is not transmitted by the regular reflection detection section, only the first light emitting element of said plurality of light emitting elements is driven by the control section, but when the regular reflection detection signal is supplied, only the second light emitting element of said plurality of light emitting elements is driven.

3. An optical reading apparatus according to claim 1, wherein when the regular reflection detection signal is not transmitted by the regular reflection detection section, all of said plurality of light emitting elements are driven, but when the regular reflection detection signal is supplied, driving of each of said plurality of light emitting elements is successively terminated until occurrence of the regular reflection condition is not detected.

4. An optical reading apparatus according to claim 1, wherein when the regular reflection detection signal is not supplied transmitted by the regular reflection detection section, said plurality of light emitting elements are intermittently driven at different times, but when the regular reflection detection signal is supplied, driving of the first light emitting element of said plurality of light emitting elements is terminated.

5. An optical reading apparatus according to claim 4, wherein, when driving of the first light emitting element terminated, said controlling driving section increases the driving voltage to the second light emitting element.

6. An optical reading apparatus according to claim 1, wherein the linear recording is a bar code, and said optical reading apparatus is a bar code reader.

* * * * *